United States Patent [19]

Wilson

[11] Patent Number: 5,636,815

[45] Date of Patent: Jun. 10, 1997

[54] MOUNTING FIXTURE FOR A HAND-HELD HAIR DRYER

[76] Inventor: Dorina S. Wilson, 10800 E. Cactus, No. 15, Scottsdale, Ariz. 85259

[21] Appl. No.: 515,951

[22] Filed: Aug. 16, 1995

[51] Int. Cl.$^6$ .................................................. A47G 29/00
[52] U.S. Cl. .................... 248/125.9; 248/125.3; 248/125.7; 248/219.2; 248/316.7; 248/176.3; 34/90; 34/96
[58] Field of Search ................... 248/125.9, 125.8, 248/125.7, 125.3, 125.2, 219.2, 316.7, 104, 106, 910, 687, 316.1, 309.1, 176.3; 34/90, 96, 97, 99

[56] References Cited

U.S. PATENT DOCUMENTS

| | | | |
|---|---|---|---|
| 185,004 | 12/1876 | White | 248/125.3 X |
| 818,005 | 4/1906 | Turner et al. | 248/423 |
| 1,910,505 | 5/1933 | Shaw | 248/161 X |
| 2,919,058 | 12/1959 | Thompson | 248/316.7 X |
| 3,398,919 | 8/1968 | Tokar | 248/316.7 X |
| 3,559,934 | 2/1971 | Jensen | 248/316.7 X |
| 4,278,223 | 7/1981 | Fauteux | 248/125.8 |
| 4,466,203 | 8/1984 | Thomas | 248/125.3 X |
| 4,712,313 | 12/1987 | Gettleman | 34/97 |
| 4,754,842 | 7/1988 | Southern | 182/111 |

*Primary Examiner*—Ramon O. Ramirez
*Assistant Examiner*—Brian J. Hamilla
*Attorney, Agent, or Firm*—Warren F. B. Lindsley

[57] ABSTRACT

A mounting fixture for a hand-held electric hair dryer comprising a base with a support surface and a hollow collar extending perpendicularly therefrom; an elongate rod supported within the hollow collar; and clamping elements on the upper end of the rod. The clamping elements include two planar clamp pads mounted in two dish-like members. The clamping elements are spring biased to accommodate the hair dryer therebetween. The spring bias is achieved either by a yoke formed of spring steel or by two pivotally secured flat members having a compression spring located between adjacent ends of the flat members. The direction of the barrel of the dryer and accordingly the direction of the column of warm air exiting from the barrel can be easily adjusted horizontally and vertically over a wide angular range allowing a user of this type of hair dryer free use of both hands while drying hair.

3 Claims, 2 Drawing Sheets

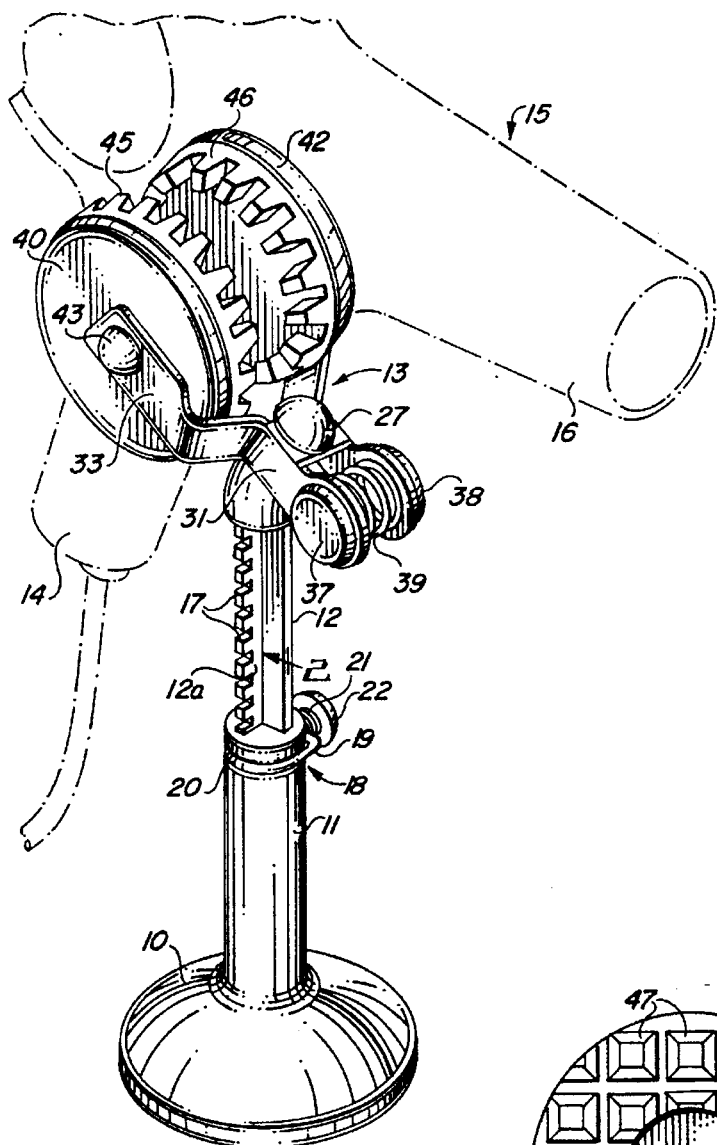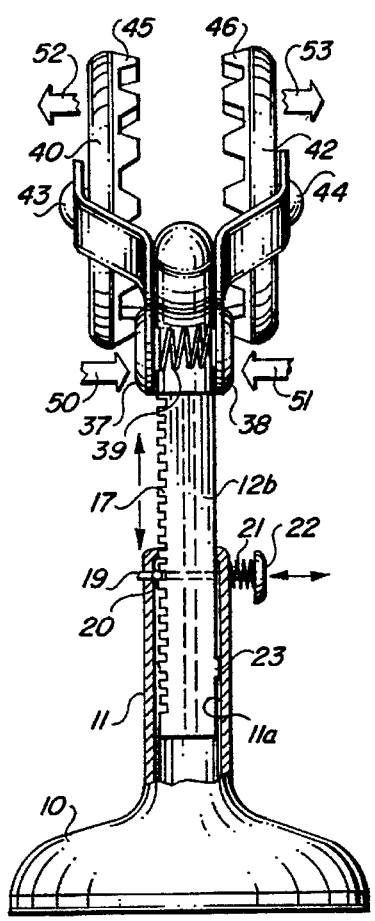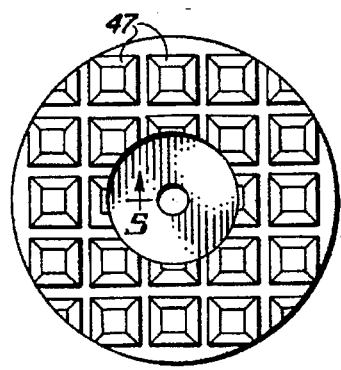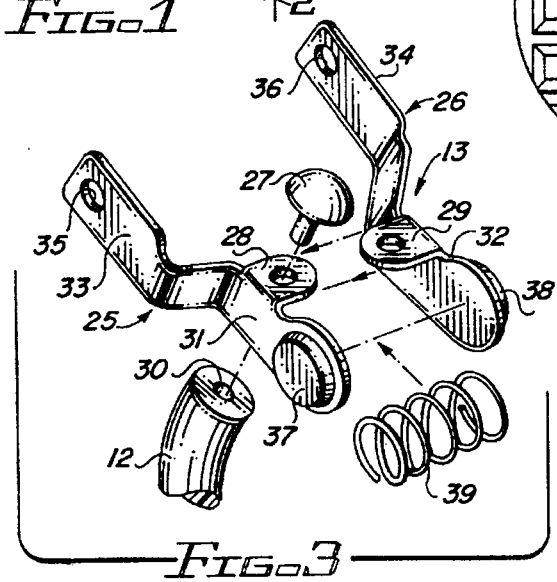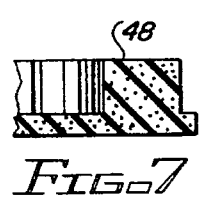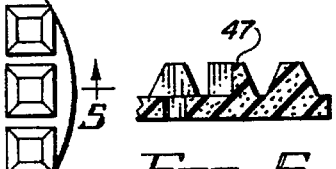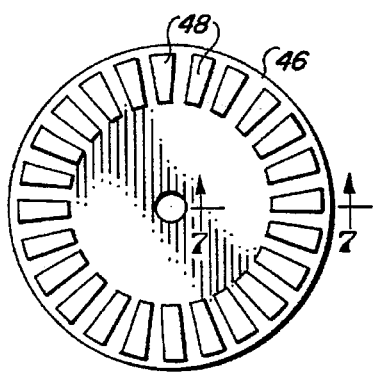

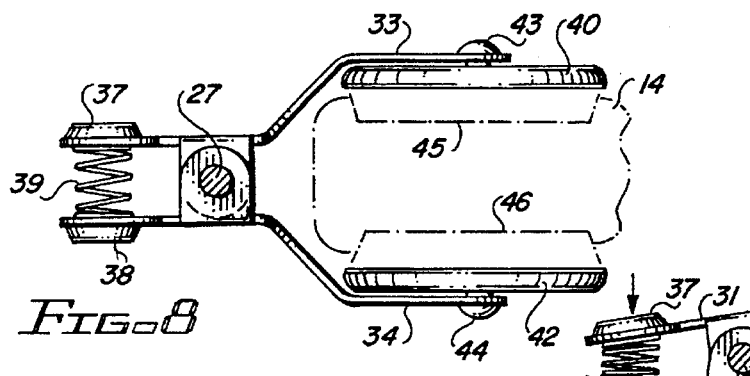
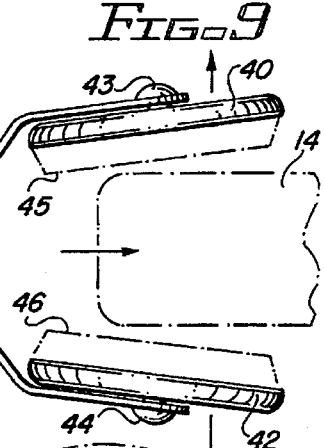
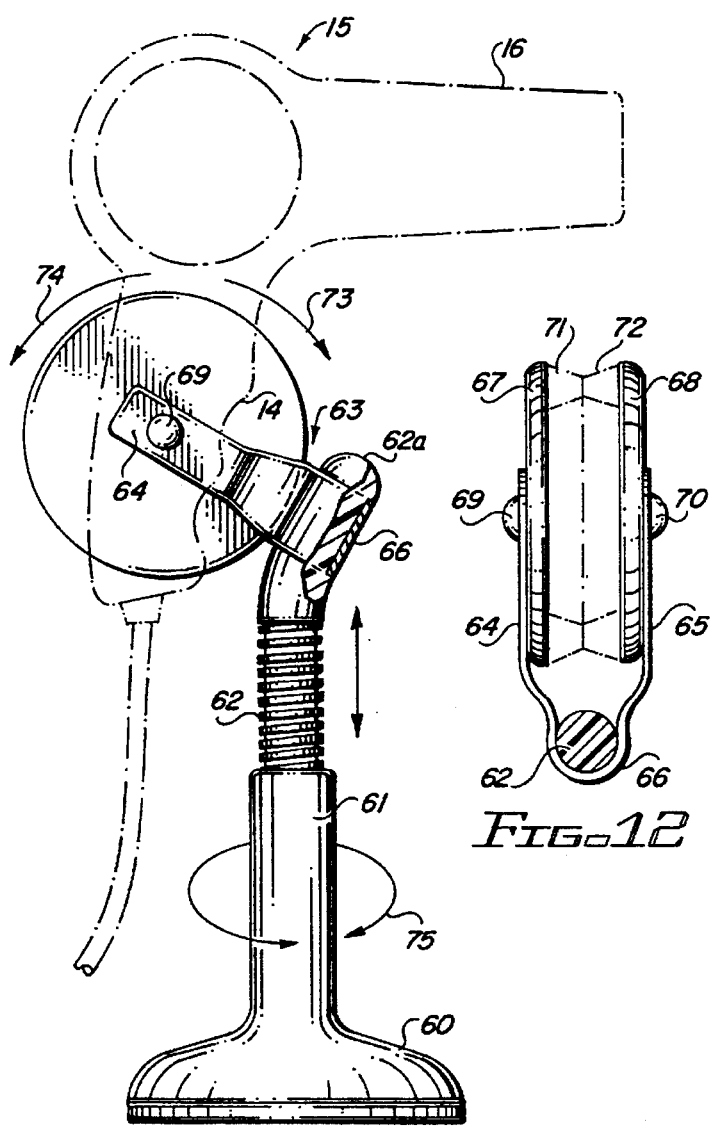
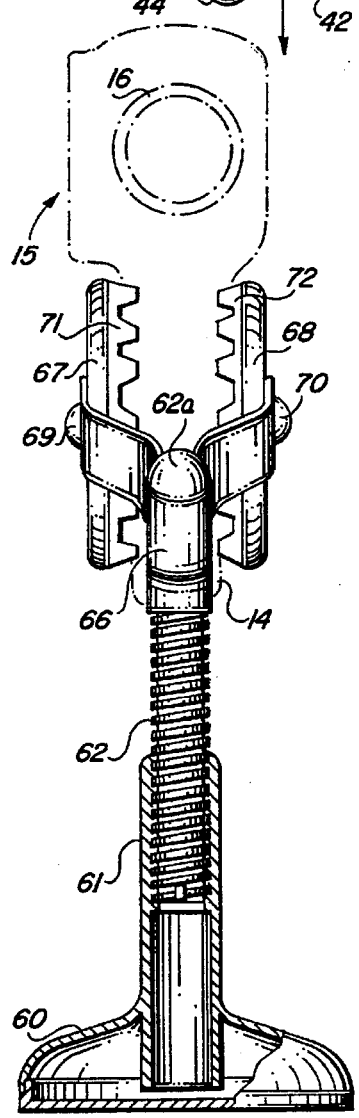

MOUNTING FIXTURE FOR A HAND-HELD HAIR DRYER

BACKGROUND OF THE INVENTION

This invention relates to a mounting fixture for a hair dryer and, more particularly, to a mounting fixture for mounting a hand-held hair dryer on a supporting surface such as a table top, enabling hands-free use of the hair dryer so both hands may be used for hairstyling.

DESCRIPTION OF THE PRIOR ART

Portable hand-held electric hair dryers are well known and are commercially available in a variety of shapes and sizes. Such hair dryers have an elongated handle and a barrel portion extending generally perpendicularly with respect to one another from a central portion. The operator holds the hair dryer by the handle and directs the barrel toward the damp hair so that the warm air impinges on it. Thus, one hand of the operator, be it a professional hair stylist in a hair salon or a person drying one's own hair, must be occupied by holding the hair dryer during its use.

Holders for hand-held blow dryers are also well known, examples being described in U.S. Pat. Nos. 5,064,154 to Payne; 5,172,880 to McDougall and 5,350,144 to Lary. There are many other examples.

The known holders suffer from various disadvantages. Some of the known holders are capable of holding only one particular model of blow dryer. Others are required to be fixedly mounted to a wall, table or chair or elsewhere. Some of the known holders are large and cumbersome and cannot readily be folded or its size reduced when not in use, or easily carried when travelling. Some of the known holders require operation of nuts, bolts, straps, clamps and the like when fitting the blow dryer in the holder. Some of the known holders, once the hand-held dryer has been fitted therein, do not allow for convenient adjustment of the height and directivity of the barrel.

SUMMARY OF THE INVENTION

A primary object of the present invention is to provide a fixture for holding a hand-held dryer which can hold any one of a variety of different blow dryers, and in particular can hold most commercially available lightweight portable hand-held electrically powered domestic blow dryers for use in styling hair.

Another object of the invention is to provide a fixture for supporting a hand-held hair dryer at an adjustable height above a support surface, such as a table top.

Another object is to provide a mounting fixture for a hand-held electric hair dryer by which the direction of the barrel of the dryer, and accordingly the direction of the column of warm air exiting from the barrel, can be easily adjusted, both horizontally and vertically, over a wide angular range.

The mounting fixture comprises a stand including a base portion having a support surface adapted to be supported on a table top and a hollow cylindrical collar extending perpendicularly upward from the base in which an elongate rod member is mounted for translation toward and away from the support surface. A spring-biased clamp attached to the free upper end of the rod detachably engages the handle of a hand-held hair dryer. Confronting surfaces of the clamp are formed of a deformable resilient material which will conform to the contour of the handle in spite of variations in shape and/or size and to spring back to its initial shape when the handle is removed from the fixture. The clamped dryer may be rotated 360 degrees relative to the base, and by virtue of the resiliency of clamping surfaces the handle may be rotated, with respect to the clamping surfaces through a large vertical angle.

BRIEF DESCRIPTION OF THE DRAWINGS

Other objects, features and advantages of the invention will become apparent, and its construction and operation better understood, from the following detailed description when read in conjunction with the accompanying drawings, in which:

FIG. 1 is a perspective view of a preferred embodiment of the present invention showing a hand-held hair dryer mounted on the fixture;

FIG. 2 is a side elevational view of the fixture, partially sectioned along line 2—2 of FIG. 1;

FIG. 3 is an exploded perspective view of a clamp assembly of the fixture;

FIG. 4 is a plan view of a first type of clamp pad;

FIG. 5 is a sectional view taken along line 5—5 of FIG. 4;

FIG. 6 is a plan view an alternative type of clamp pad;

FIG. 7 is a sectional view taken along line 7—7 of FIG. 6;

FIG. 8 is a top view showing the clamp in a clamping position;

FIG. 9 is a top view showing the clamp in a release position;

FIG. 10 is a front elevation of an alternative fixture in accordance with the invention;

FIG. 11 is a side elevation, partially in section, of the fixture of FIG. 10; and FIG. 12 is a top plan view showing the clamp of the fixture of FIG. 10 in clamping position.

DESCRIPTION OF THE PREFERRED EMBODIMENT

A first embodiment of the invention, shown in FIGS. 1–9, comprises a circular base 10, having a flat support surface, preferably weighted for stability, a vertically-oriented elongated hollow collar 11 integral with the base and extending upward therefrom, an elongated rod 12 supported within collar 11 for translation toward and away from the support surface, and a clamping mechanism 13 secured at the upper end of rod 12 for receiving the handle 14 of a hand-held hair dryer 15 having a barrel 16 oriented generally perpendicularly to its handle 14. Elongated rod 12 has a cruciform shape in cross-section and collar 11 has a bore 11a of the same shape for telescopically receiving rod 12. One longitudinal arm 12a of the rod has a series of notches 17 distributed along a major portion of its length which may be selectively engaged and disengaged by a latch device 18 consisting of a loop of wire 19 encircling collar 11 and fitted in a semi-circular slit 20 formed in the collar near its upper end. The wire loop is urged into engagement with a slot 17 by a compression spring 21 disposed diametrically opposite slit 20 and supported between the outer surface of collar 11 and an inner surface of a flat circular finger-actuable button 22 secured to a free end of wire loop 19. Pressing button 22 against the bias of spring 21 releases the catch and allows translational movement of rod 12 relative to collar 11 and thereby adjustment of the overall height of collar 11 and rod 12. A protrusion 23 on arm 12b near the lower end of the rod cooperates with the shaped upper end of collar 11 to limit the upward movement of rod 12.

Referring to FIG. 3, clamping mechanism 13 comprises a pair of stamped metal parts 25 and 26, each of a shape which is a mirror image of the other, which are secured to a cylindrical upper end of rod 12 by a rivet 27 extending through aligned openings in inwardly extending tabs 28 and 29 and received with a press fit in an opening 30 formed in the end of rod 12. Tabs 28 and 29 are integral elements of metal parts 25 and 26, respectively, and each is oriented perpendicularly to a respective side section 31 and 32 which, when assembled as described, are disposed in vertical planes in parallel confronting relationship. At a point slightly inward from the tab, each part is bent outwardly by an angle approaching 90 degrees and then is bent through an angle of about 90 degrees to provide respective side sections 33 and 34 disposed generally parallel to one another with the space between them greater than the space between side sections 31 and 32. Side sections 33 and 34 have respective apertures 35 and 36 near their distal ends, the purpose of which will be described presently.

The free ends of side sections 31 and 32 are respectively provided with finger pads 37 and 38 each having on its inner surface a circular depression for receiving one end of a compression spring 39. Spring 39 is sufficiently long and strong as to normally urge finger pads 37 and 38 away from one another about rivet 27 and, accordingly, to urge the distal ends of side sections 33 and 34 toward one another. It will be appreciated that rivet 27 serves not only as a pivot for parts 25 and 26 but also allows rotation of clamping mechanism 13 relative to rod 12 and, accordingly, the base 10.

The clamping mechanism 13 is completed by a pair of rigid shallow, circular dish-like plates 40 and 42 to which the distal ends of side sections 33 and 34 are secured by respective bolts 43 and 44 extending through openings 35 and 36 and centrally located openings in plates 40 and 42. Secured by press fit within the rim of each of plates 40 and 42 is a circular pad 45 and 46, respectively, formed of a resilient material capable of being deformed to conform to the contour of a hair dryer handle. The pads may be formed of commercially available convoluted foam plastic having 1.8 lb.+density, either die-cut to have the waffle pattern of knobs 47 shown in FIGS. 4 and 5, or molded to have the pattern of peripheral lugs 48 shown in FIGS. 6 and 7. The knobs or lugs, as the case may be, are firm enough to hold a hair dryer in desired position, yet are sufficiently deformable to allow adjustment of the position of the hair dryer relative to the pads.

In use, the fixture is placed on a table or other flat surface, finger pads 37 and 38 are pressed toward one another, as indicated by arrows 50 and 51 in FIG. 2, thereby to spread clamping pads 45 and 46 apart, as indicated by arrows 52 and 53 in FIG. 2, a sufficient distance to receive the handle 14 of a hair dryer 15 therebetween. When the handle 14 has been adjusted to an angular position relative to clamp pads 45 and 46 in which the barrel 16 points in the desired vertical direction, pressure on the finger pads is released, allowing spring 39 to expand and urge side sections 33 and 34 and plates 40 and 42 supported thereon, toward one another, and to force deformable foam pads 45 and 46 into firm holding engagement with the dryer handle, as depicted in FIG. 8. The hair dryer is easily removed from the fixture by pressing finger pads 37 and 38 to compress spring 39 as depicted in FIG. 9, thereby to open the space between the clamping pads enough to release the dryer handle 14. It will be appreciated that the deformable lugs or knobs of the clamping pads gives a good firm grip, a desirable feature in view of the very smooth curved surfaces of most conventional commercially available blow dryers. It will also be appreciated that the fixture can be used in connection with blow dryers of a variety of different sizes and shapes and, in particular, is adapted to firmly grip the handle portion of most conventional commercially available models of portable hand-held electrically powered blow dryers for the hair.

The height above a table or desk of the open end of the barrel 16 of a supported blow dryer 15 is readily adjustable by pressing button 22 to disengage latch 19 and thereby allow rod 12 to be raised or lowered relative to collar 11. When the clamping mechanism has been adjusted to the desired height, button 22 is released and rod 12 locked in place.

To enable the fixture to be used in a free-standing mode on a table, desk or other horizontal surface, base 10 has a relatively large area and is sufficiently heavy to prevent the fixture from toppling over under the weight of the blow dryer. If necessary, the base may include an additional weight for providing ballast.

Referring now to FIGS. 10, 11 and 12, an alternative embodiment of the fixture has a circular relatively heavy base 60 having a flat support surface, an integral vertically oriented, internally threaded collar 61, an elongated threaded rod 62 threadably engaging the threaded bore of collar 61, and a clamping mechanism 63 secured at the upper end of rod 62 for holding the handle 14 of a hand-held dryer 15. Rod 62 is preferably formed of injection molded high impact plastic material, is circular in cross section and at its upper end has a portion 62a inclined slightly from the vertical. Clamping mechanism 63 comprises a generally rectangular flat strip of spring steel bent to form a U-shaped tension yoke which, as best seen in FIG. 12, has opposed arms 64 and 65 joined at its closed end by a section 66 having a circular curvature of diameter to receive and firmly engage the inclined upper end portion 62a of rod 62. By virtue of the inclination of end portion 62a, arms 64 and 65 are angularly displaced upward from the horizontal.

Each of arms 64 and 65 is secured near the distal end to a rigid circular, shallow saucer-like member 67 and 68, respectively, by bolts 69 and 70, which prevent relative rotation thereof, with respect to arms 64 and 65. Circular clamp pads 71 and 72, which may have either of the surface patterns shown in FIGS. 4 and 6, are held in confronting relationship by press fit in circular members 67 and 68, respectively. The yoke is pretensioned to normally urge the confronting surfaces of pads 71 and 72 into contact with each other, and to exert sufficient force when the pads are spread apart a distance sufficient to receive the handle 14 of a hair dryer therebetween to deform the foam pads and firmly grip the handle. As discussed in connection with the FIG. 1 embodiment, the pad material is sufficiently resilient to allow the handle 14 to be rotated relative to the pads, as indicated by arrows 73 and 74 in FIG. 10, for changing the vertical pointing angle of the barrel of the dryer. The horizontal pointing angle is adjustable through 360 degrees simply by rotating rod 62 by one turn relative to collar 61, and the height of the dryer above the supporting surface can be raised or lowered, as desired, by twisting the base 60 and integral collar 61 relative to threaded rod 62, as indicated by arrow 75.

While the described fixtures are primarily intended for use in connection with hand-held blow dryers, it will be appreciated that they may be used for holding a variety of other appliances of comparable shape and size.

While the invention has been described by reference to preferred embodiments, it should be understood that persons skilled in the art will now envision changes which nonetheless fall within the spirit and scope of the inventive concepts described. Accordingly, it is intended that the invention not be limited to the disclosed embodiments, but that it have the full scope permitted by the language of the appended claims.

What is claimed is:

1. A mounting fixture for supporting a hand-held hair dryer having an elongated handle and a barrel extending from a central portion, the handle and barrel having a generally perpendicular orientation with respect to one another, said mounting fixture comprising:
   a base having a support surface and including a hollow collar extending from said base in a direction perpendicular to said support surface;
   an elongate rod supported within said hollow collar for translation toward and away from said support surface and having an upper end; and
   clamp means secured at said upper end of said elongate rod, wherein said clamp means comprises first and second planar clamp pads formed of resilient deformable material, means supporting said clamp pads in vertical planes in parallel confronting relationship with one another, and means for spring-biasing said supporting means toward one another, said supporting means adapted to be separated against the bias of said spring-biasing means a distance sufficient to receive the dryer handle between said clamp pads and then released to firmly grip the handle between said pads;
   said clamp pads being circular in shape, and wherein said means for supporting said pads comprise first and second rigid, circular, shallow dish-like members for respectively supporting said first and second pads, and wherein said means for spring-biasing said supporting means toward one another comprises first and second flat members pivotally secured to said upper end of said rod and disposed in parallel vertical planes in parallel confronting relationship, means securing a first end of said first and second flat members to said first and second dish-like members, respectively, and compression spring means disposed between said first and second flat members near a second end and adapted to urge said dish-like members toward one another.

2. The mounting fixture of claim 1 wherein each of said clamp pads is formed of foamed plastic and has a pattern of protuberances on the surface thereof that confronts the other pad.

3. A mounting fixture for supporting a hand-held hair dryer having an elongated handle and a barrel extending from a central portion, the handle and barrel having a generally perpendicular orientation with respect to one another, said mounting fixture comprising:
   a base having a support surface and including a hollow collar extending from said base in a direction perpendicular to said support surface;
   an elongated rod supported within said hollow collar for translation toward and away from said support surface and having an upper end;
   clamp means secured at said upper end of said elongate rod, wherein said clamp means comprises first and second planar clamp pads formed of resilient deformable material, means supporting said clamp pads in vertical planes in parallel confronting relationship with one another, and means for spring-biasing said supporting means toward one another, said supporting means adapted to be separated against the bias of said spring-biasing means a distance sufficient to receive the dryer handle between said clamp pads and then released to firmly grip the handle between said pads;
   said clamp pads being formed of a foamed plastics material, are circular in shape and each has a pattern of protuberances on the surface thereof that confronts the other pad,
   wherein said means for supporting said pads comprise first and second rigid circular, shallow dish-like members in which said first and second clamp pads are respectively received with a press fit, and
   wherein said means for spring-biasing said supporting means toward one another comprises a generally U-shaped tension yoke formed of strip spring steel, wherein said yoke has first and second generally parallel arms extending from a closed end and at said closed end has a circularly curved section for receiving said upper end of said rod and securing said yoke thereto, and means for securing a distal end of said first and second arms of said yoke to said first and second dish-like members, respectively.

* * * * *